United States Patent
Bhide et al.

(10) Patent No.: US 7,917,512 B2
(45) Date of Patent: Mar. 29, 2011

(54) METHOD FOR AUTOMATED DESIGN OF RANGE PARTITIONED TABLES FOR RELATIONAL DATABASES

(75) Inventors: Manish A. Bhide, New Delhi (IN); Sam S. Lightstone, Toronto (CA); Laurent S. Mignet, New Delhi (IN); Sumit Negi, New Delhi (IN); Daniele C. Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 11/948,360

(22) Filed: Nov. 30, 2007

(65) Prior Publication Data

US 2009/0144235 A1  Jun. 4, 2009

(51) Int. Cl.
 *G06F 7/00*    (2006.01)
 *G06F 17/30*   (2006.01)
(52) U.S. Cl. .................................. 707/737; 707/972
(58) Field of Classification Search .................. 707/737, 707/736, 705, 964, 968, 972, 100–102, 999.1–999.102
See application file for complete search history.

(56) References Cited

U.S. PATENT DOCUMENTS

| | | | |
|---|---|---|---|
| 6,101,495 A | | 8/2000 | Tsuchida et al. |
| 7,158,996 B2 | | 1/2007 | Croisettier et al. |
| 2002/0194157 A1 | | 12/2002 | Zait et al. |
| 2004/0122845 A1 | | 6/2004 | Lohman et al. |
| 2004/0260684 A1 | | 12/2004 | Agrawal et al. |
| 2005/0038784 A1 | * | 2/2005 | Zait et al. ........................... 707/5 |
| 2005/0160074 A1 | | 7/2005 | Vos et al. |
| 2006/0085378 A1 | * | 4/2006 | Raizman et al. .................. 707/1 |
| 2006/0085484 A1 | * | 4/2006 | Raizman et al. ............. 707/200 |

OTHER PUBLICATIONS

Wikipedia, "Tirangular matrix" Oct. 26, 2007, Wikipedia.org, p. 1-5.*
Rao, Jun et al., "Automating Physical Database Design in a Parallel Database" Jun. 6, 2002, ACM SIGMOD, p. 1-12.*
Zhao, X et al. "PPS—A Parallel Partition Sort Algorithm for Multi-processor Database Systems." Proceedings of the 11th International Workshop on Database and Expert Systems Applications, 2000.
Table Partitioning and Multidimensional Clustering Tables. Downloaded at http://publib boulder ibm.com/infocenter/db2luw/v9/index jsp?topic=/com ibm db2 udb admin doc/doc/c0021605.htm.
"Catalog Statistics Tables" Downloaded at http://publib boulder ibm. com/infocenter/db2luw/v9/index jsp?topic=/com.ibm.db2 udb admin.doc/doc/c0005087.htm.
Feelifl, H. et al "RING: A Stategy for Minimizing the Cost of On-line Data Placement Reorganization Over Btree Indexed Database Over Shared-nothing Parallel Machines" Proceedings of the Seventh International Conference on Database Systems for Advanced Applications 2001.
Barua, R et al. Communication-Minimal Partitioning of Parallel Loops and Data Arrays for Cache-Coherent Distributed-Memory Multiprocessors Languages and Compilers for Parallel Computing p. 350-368. 1997.

* cited by examiner

*Primary Examiner* — Brent Stace
(74) *Attorney, Agent, or Firm* — Ryan, Mason & Lewis, LLP

(57) ABSTRACT

A workload specification, detailing specific queries and a frequency of execution of each of the queries, and a set of partitions, are obtained for the database, as inputs. A number of candidate tables are identified for the database, the tables having a plurality of attributes. A chosen attribute is allocated for each of the tables, to obtain a set of tables and a set of appropriate partitions for each of the tables.

6 Claims, 4 Drawing Sheets

FIG. 2A

```
j=1;
For (j< | F_k |)
        e_i=F_k[j]
        Normalize(e_columns, e_table, workload)
        j++;
End For Normalize (column, table, workload)
    If TypeOfColumn(columns)=='VARCHAR'
        Find-Buckets-For-Column (TableName,ColumnName,Workload) returns Buckets
    If TypeOfColumn(columns)=='DATE'
        Find-Buckets-For-Column (TableName,ColumnName,Workload) returns Buckets
        Find-Fixed-Buckets (TableName,ColumnName,Workload) returns Buckets
        //DBA selects the best out of the two approaches
    If TypeOfColumn(columns)=='NUMERIC'
        Find-Buckets-For-Column (TableName,ColumnName,Workload) returns Buckets
end Find-Buckets-For-Column (TableName,ColumnName,Workload)
    Find the number of cells in the column based on the workload;
    Create array CELL_SIZE which has number of rows in each cell;
    Create upper triangular matrix A
        /*A has the number of rows in every possible partition of the array */
        A[1,1]=CELL_SIZE[1];
        For i = 2 to N;
            A[1,i] = A[1,i-1]+CELL_SIZE[i];
210     End-for;
        For i = 2 to N;
            For j = i to N;
                A[i,j] = A[1,j] - A[1,i-1]
            End-for;
        End-for;
    Create upper triangular matrix B
        /* B computes the number of queries that access a given partitions*/
        B is computed by examining the worklaod and based on partition size.
    Compute COST matrix as:
        For i= 1 to N;
            For j = i to N;
212             COST[i,j] = A[i,j]*B[i,j];
            End-for
        End-for
```

FIG. 2B

214 {
Solve the following recurrence relation:

$$M[n,k] = \min_{i=1}^{N} [sum(M[i,k-1], COST(i+1,N))]$$

$$M[1,k] = s_1$$

$$M[n,1] = \sum_{i=1}^{n} s_i$$

end

M[n,k] is the cost of the best partition and the partition is given as a by-product of the recurrence relation. We can put an extra constraint saying that the size of the partition should not be greater than some percentage of the total size of the column so as to ensure even distribution of partitions
}

216 {
*Find-Fixed-Buckets(TableName, ColumnName, Workload)*
    $P_1$ = Partitions generated on daily basis;
    $C_1$ = Cost of workload for $P_1$;
    $P_2$ = Partitions generated on weekly basis;
    $C_2$ = Cost of workload for $P_2$;
    $P_3$ = Partitions generated on monthly basis;
    $C_3$ = Cost of workload for $P_3$;
    $P_4$ = Partitions generated on quarterly basis;
    $C_4$ = Cost of workload for $P_4$;
    $P_5$ = Partitions generated on yearly basis;
    $C_5$ = Cost of workload for $P_5$;
    Best Cost = min ($C_1, C_2, C_3, C_4, C_5$);
    Return partition with best Cost;
    /* more partition types can be used based on input from DBA*/
end
}

METHOD FOR AUTOMATED DESIGN OF RANGE PARTITIONED TABLES FOR RELATIONAL DATABASES

CROSS-REFERENCE TO RELATED APPLICATION(S)

The present application is related to a commonly assigned U.S. application Ser. No. 11/948,435 entitled "System and Computer Program Product For Automated Design Of Range Partitioned Tables For Relational Databases," filed on even date herewith, the disclosure of which is incorporated by reference herein in its entirety.

FIELD OF THE INVENTION

The present invention relates to the electrical, electronic and computer arts, and, more particularly, to relational databases and the like.

BACKGROUND OF THE INVENTION

Range Partitioning is an interesting feature that was introduced in IBM DB2® brand computer software version 9 (registered mark of International Business Machines Corporation, Armonk, N.Y., USA) ("IBM"). Table partitioning (sometimes referred to as range partitioning) is a data organization scheme in which table data is divided across multiple storage objects, called data partitions, according to values in one or more table columns. These partitions are completely transparent to the applications. That is, applications can continue to access data by specifying column and table names, and do not need to "worry" about which data partition(s) the data resides in.

U.S. Patent Publication No. 2002-0194157 of Zait et. al. discloses partition pruning with composite partitioning. Specifically, the Zait publication discloses techniques for expanding the concept of partitioning in variety of ways. In particular techniques are provided for performing multiple-dimension partitioning. In multiple-dimension partitioning, a database object is divided into partitions based on one criterion, and each of those resulting partitions is divided into sub-partitions based on a second criterion. The process of partitioning partitions based on different criteria may be repeated across any number of dimensions. Entirely different partitioning techniques may be used for each level of partitioning. The database server takes advantage of partitions when processing queries by selectively accessing a subset of partitions on disk or reducing the number of internal join operations.

SUMMARY OF THE INVENTION

Principles of the present invention provide techniques for automated design of range partitioned tables for relational databases. In one aspect, an exemplary method (which can be computer implemented) for recommending range-partitioned tables in a relational database includes the steps of obtaining a workload specification for the database, the workload specification detailing specific queries and a frequency of execution of each of the queries; obtaining a catalog specification for said database, said catalog specification detailing a definition of tables and columns within said tables; and obtaining a set of partitions for the database. Given these inputs, additional steps include identifying a plurality of candidate tables for the database, the tables having a plurality of columns; and allocating a chosen column for each of the tables, to obtain a set of tables and a set of appropriate partitions for each of the tables.

It should be noted that one or more inventive embodiments recommend an appropriate way, and preferably the best ("optimal") way to slice a table (that is, to partition a table). The mechanism of partitioning a table, per se, is known to the skilled artisan.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more of the following technical benefits:
 Improved manageability for large tables
 Increased query performance through data partition elimination
 Fast online data roll-in/roll-out
 Better optimization of storage costs
 Larger table capacity
 Greater index placement flexibility.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIGS. 2A and 2B show exemplary pseudo-code for one specific, non-limiting implementation of an aspect of the invention;

DETAILED DESCRIPTION OF PREFERRED EMBODIMENTS

One or more embodiments of the invention provide a method and an apparatus that compute appropriate, and preferably "optimized" or "best," partitions for a set of tables in a database, given a workload. Implementation of one or more inventive techniques, within the range partitioning context, will, in one or more embodiments, improve the workload execution time.

Figure 1:
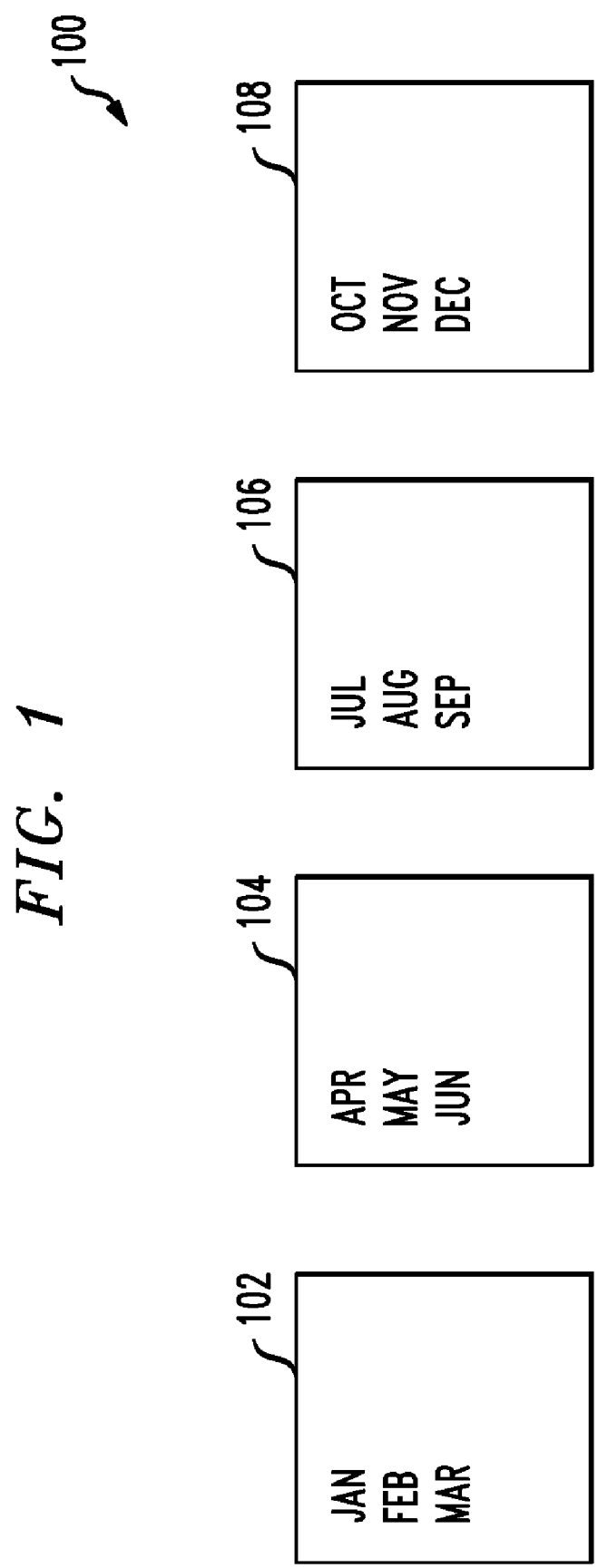
FIG. 1 shows an exemplary range-partitioned database.

FIG. 1 shows an exemplary range-partitioned database 100 created using the following Structured Query Language (SQL) expression: "CREATE TABLE orders(id INT, shipdate DATE, . . . ) PARTITION BY RANGE(shipdate) (STARTING '1/1/2006' ENDING '12/31/2006' EVERY 3 MONTHS)". One or more exemplary embodiments of the invention disclosed herein will recommend such range-partitioning for a workload querying this table on quarterly basis. The four partitions are numbered 102, 104, 106 and 108.

Optimizer programs for databases, such as those for the DB2® database, are typically data-partition-aware. Therefore, during query execution, only the relevant data partitions are scanned. Eliminating the need to scan data partitions that are not impacted by the query can result in improved performance. For instance, any queries on the table layout shown in FIG. 1 on the month January will keep the three other partitions untouched, and hence available for other queries.

One or more embodiments of the invention help the data base administrator (DBA) to systematically explore which set of tables (and for each table chosen, which table's column pairs) should be used for range partitioning, given the current workload on the database. Suggestions can also be developed regarding the actual partitions (preferably, the optimal set) that need to be created for each of the tables in the database. The partitions suggested by one or more embodiments of the invention are such that they result in enhanced, and preferably optimal, performance for the given workload. In one non-limiting example, an inventive apparatus is an implementation of an exemplary inventive method, and uses several inputs from a database manager (that is, a piece of software—a DBMS (Data Base Management System) such as IBM DB2® brand computer software or Oracle® brand computer software (registered mark of Oracle International Corporation, 500 Oracle Parkway, Redwood City, Calif. 94065)). In one implementation, inventive techniques are implemented by enhancing database design software, such as IBM DB2® Design Advisor module part of IBM DB2® software.

A specific non-limiting detailed example of an inventive method will now be described with regard to FIGS. 2A, 2B, and 3. In one aspect, an exemplary method works in two parts. In the first part, candidate tables and attributes within one or more tables are found. Note that, as used herein, a table's "attributes" or a table's "columns" are synonymous. One specific manner of carrying Out this step is described with regard to blocks 304 through 310 of FIG. 3. In the second part, the chosen attribute for each table selected during the first step is allocated to the partition. One specific manner of carrying out this step is discussed with regard to block 312 of FIG. 3. Purely for purposes of descriptive convenience, it is assumed in this description that all partitions have the same characteristics. However, those skilled in the art, given the teachings herein, can extend the exemplary method by giving appropriate weight to the different partitions, in order to map their characteristics.

In general terms, inputs to the exemplary method include a workload (set of queries) specification, detailing specific queries and the frequency of execution of each, database catalog information, and a set of partitions; while the outputs include a set of tables and appropriate (preferably the best) partitions for each table selected. The exemplary method provides a model for detecting candidate tables, columns and ranges for a database and workload.

Figure 3:
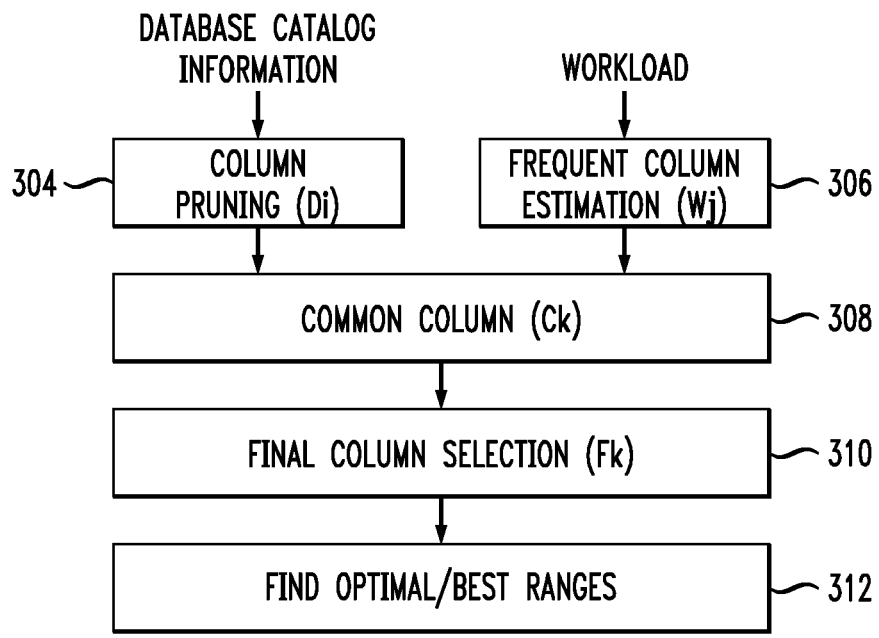
FIG. 3 shows a flow chart of exemplary method steps.

With specific reference now to FIG. 3, block 304 includes a column pruning step. For given database catalog information, columns on which the database tables can be partitioned (use of language such as "we" is not necessarily intended to imply human agency, but is also intended to cover steps performed by a computer or in other automated or semi-automated fashion) are determined. A column should take value in a pre-defined domain, such as Type DATE, TIME, TIMESTAMP; Integer, decimal, short; and/or a string taking value on a predefined domain such as enumeration. Given the teachings herein, the skilled artisan will appreciate that more data types can be taken into account; purely for purposes of descriptive convenience, this description is limited to the just-mentioned pre-defined domains. The set of columns selected using the above criteria can be denoted by $D_i$.

$$D_i = [\text{Table-}A\ (Z, Y), \text{Table-}B\ (W), \text{Table-}C\ (U, Y, I)] \qquad \text{Eq. 1}$$

Block 306 includes a step of frequent column estimation. For a given workload, a QRM (query reference matrix) is constructed. Using the QRM, candidate columns are selected based on the frequency of occurrence of columns in RANGE, IN, BETWEEN, GROUP BY, ORDER BY, WHERE (equality, for example, REGION='NW' and inequality, for example, month<='April') predicates of the workload. For each table, the top 3 columns are selected, based on the frequency of occurrence of the column in any of the above-specified predicates. The selected column set for the entire database can be designated as $W_j$.

$$W_j = [\text{Table-A (Z) \#N @Usage}_A,$$
$$\text{Table-B (W, T) \#M @Usage}_B,$$
$$\text{Table-C (U, Y) \#M @Usage}_C,$$
$$\text{Table-D (T, R) \#O @Usage}_D$$
$$] \quad \text{where}$$

N denotes the number of times column Z is accessed in Table A in either a RANGE, IN, GROUP BY or ORDER BY predicate @Usage$_A$: denotes the usage of column Z in queries E.g. Z='23', Z=BETWEEN '23' AND '50' and so on.
Eq. 2

Block 308 includes a step of finding columns, $C_k$, that are common between $D_i$ and $W_j$, that is, between step 304 and step 306.

$$C_k = D_i \cap W_j = [\text{Table-}A\ (Z)), \text{Table-}B\ (W), \text{Table-}C\ (U, Y)] \qquad \text{Eq. 3}$$

Block 310 includes a final column selection step. Due to space and query efficiency constraints, the data partitioning typically cannot be done on multiple columns for a given table. Hence, if there are multiple columns for a single table in the set $C_k$, the set $C_k$ is pruned to a single column. This is done in step 310. In the exemplary embodiment under discussion, only one column per table is handled; hence, if at the end of step 308 a table has more than one column, the final candidate is pruned in step 310 to get only one column per table is pruned. It is to be emphasized that this is a constraint of the particular exemplary embodiment, and other embodiments of the invention need not be so constrained.

A column which takes part in a "join" with another table is used very heavily as compared to other columns. Hence, such a column is given the first preferences in step 310. If there is no such column, then the column selection is based on the frequency of use of the column. Hence the criterion for performing final column selection step 310 can be summarized as:

1. For each table, select the column which is used in a "join" with another table; and
2. If there is no such column, then select the column with the highest frequency value (that is, #N value) in the Query Reference Matrix The table is partitioned using this column.

The final column set can be denoted $F_K$

By way of summary and review, in step 304, from the catalog, the definition of each column (categorical value (date, integer, enumeration)) is determined. In step 306, from the workload, interesting tables and columns are determined. In step 308, the two sets intersect to keep only categorical columns (and table(s) they belong to) that are relevant for the workload. In step 310, if more than one column for a table is selected in step 308, preference is given to only one, based on some heuristics such as, by way of example and not limitation, join condition and the like.

Step 312 includes finding optimal ranges. Once (i) the column of each table on which we have to perform the partitioning (from step 310) and (ii) the number of partitions (an input) are obtained, the final step is to find the actual data that needs to reside in each partition, so that the execution of the workload is enhanced, and preferably optimized. Each partition can be represented using ranges (if it is a date column) or by the distinct values which constitute each range. That is, in step 312, for each column output by step 310, the best range (or how to split a column into small pieces/partitions) that will give the most performance gain for the given workload can be determined. In one or more embodiments, step 312 can be based, at least in part, on extracting natural ranges present in the workload.

Optimal ranges are then determined using a dynamic-programming-based method. In this method, the goal is to find the optimal partitions, such that the cost of executing the query workload is minimized. The cost of executing a query workload is defined as the number of rows that need to be accessed by all the queries constituting the workload. It is important to note that if a query accesses two partitions, then the query is assumed to access all the rows of the two partitions. This might not necessarily be true (if there are additional indexes for a partition); however, the worst case scenario so as to get the best partition is used. The exemplary technique described herein uses a recursive exhaustive search approach. If the recurrence relation is evaluated without storing partial results, then the technique will spend exponential time. Hence, the partial results are stored to speed up the execution, and the inventive dynamic-programming-based algorithm requires $O(n^2k)$ time where n is the number of distinct value of the column and k the number of partition. The parameter k is generally a small number; hence, executing this technique (which is a one time activity) is very efficient and practical. One specific manner for carrying out step 312 is described below with regard to FIGS. 2A and 2B. Following step 312, processing of the method of FIG. 3 is complete.

With specific reference now to FIGS. 2A and 2B, first the query workload is analyzed, to find the various boundaries of the column under investigation. A boundary is a value of the column which is used as a boundary of a query, for example, Date<Feb. 9, 2001. In this case, Feb. 9, 2001 is a boundary. If there are no boundaries, then use either all the distinct values in the cell (if that is small) or divide the column into a fixed number of cells of equal size (if it is numeric or date). Note that the boundaries divide the column into regions which we denote as cells. This step is part of parsing the workload, as done in blocks 306 and 310, and is not included in the pseudo-code of FIGS. 2A and 2B.

With reference to the portion of the pseudo-code designated as 210, the CELL_SIZE array has N elements (where N is the number of cells in the column). The CELL_SIZE[i] entry stores the size of the $i^{th}$ cell in the column. This can be easily found using the statistics collected by the query optimizer. The upper triangular matrix A stores the number of rows in the different sub-sets of cells. An entry A[i,j] represents the number of rows present in a partition formed of cells i to j. The upper triangular matrix B stores the number of queries in the workload that access a given partition formed by combining cells. If a query with frequency L accesses the partition, then we treat it as if it was L separate queries accessing the partition.

Referring to code segment 212, the COST matrix computes the cost of executing the given workload for a given partition formed by merging cells. As mentioned earlier, if a query accesses a partition, then it is assumed to access all the rows in the partition. Hence the cost of a partition is given by multiplying the respective entries in matrix A and B.

As shown at 214, the recurrence relation is used to compute an appropriate partition (preferably the best partition) and its cost. The relation uses the COST matrix and it avoids repetitive computation of the same value. Hence the overall complexity of executing the recurrence relation is $O(n^2k)$. Note that the computation of the cost can be also solved by adding some constraint(s). Such constraint(s) can be, for instance, the maximum space that the table, once partitioned, can take on the storage medium as described at the end of step 214. Such space constraint(s) can either be input as a relative or absolute number by a DBA. The estimated space that a partition will use can easily be estimated for the present data by summing up the size of the rows that will be stored in this partition. A more sophisticated way is also to take in account the number of rows that will be stored in the future, for example, by using statistics on the data or by taking, as input from the user, some hints to model the future changes of the data.

With reference to 216, for Date data type, compute the cost of using fixed size buckets. This allows the DBA to select buckets which can be repetitive. A bucket is a group of one or more contiguous cells. This can be useful in the case when the data changes over time and the DBA knows that generating buckets on, for example, a quarterly basis will stand the test of time.

It will be appreciated that one or more embodiments of the invention use the workload, and data characteristics, to automatically discover both DATE and Non-DATE (e.g. VARCHAR, CHAR, INT) keys for range partitioning. Further, one or more inventive embodiments rank these candidate keys based on a benefit measure and/or automatically find appropriate, and preferably optimum, ranges for each cell, using a cost function.

Thus, one or more embodiments of the invention provide a method and apparatus that take a workload and database catalog information as input, and recommend a set of tables, columns and corresponding ranges for a given database and workload. The cost of each query can be estimated using query cost techniques. Natural range(s) present in the query workload can be extracted and used to find partitions of an attribute of a table. Users can specify the number of partitions to be generated. A maximum space that the relations can use once range-partitioned can be taken into account. Users are able to provide hints to the method to model future changes of the data.

The skilled artisan will already be familiar with modern database programs such as IBM DB2® brand computer software version 9. The document "DB2 Table Partitioning and Multidimensional Cluster Tables," available at: http://publib.boulder.ibm.com/infocenter/db2luw/v9/index.jsp?topic=/com.ibm.db2.udb.admin.doc/doc/c0021605.htm, and the document "DB2 Catalog Statistics Tables," available at: http://publib.boulder.ibm.com/infocenter/db2luw/v8/index.jsp?topic/com.ibm.db2.udb.doc/admin/c0005087.htm, are both expressly incorporated herein by reference in their entirety for all purposes.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 4:
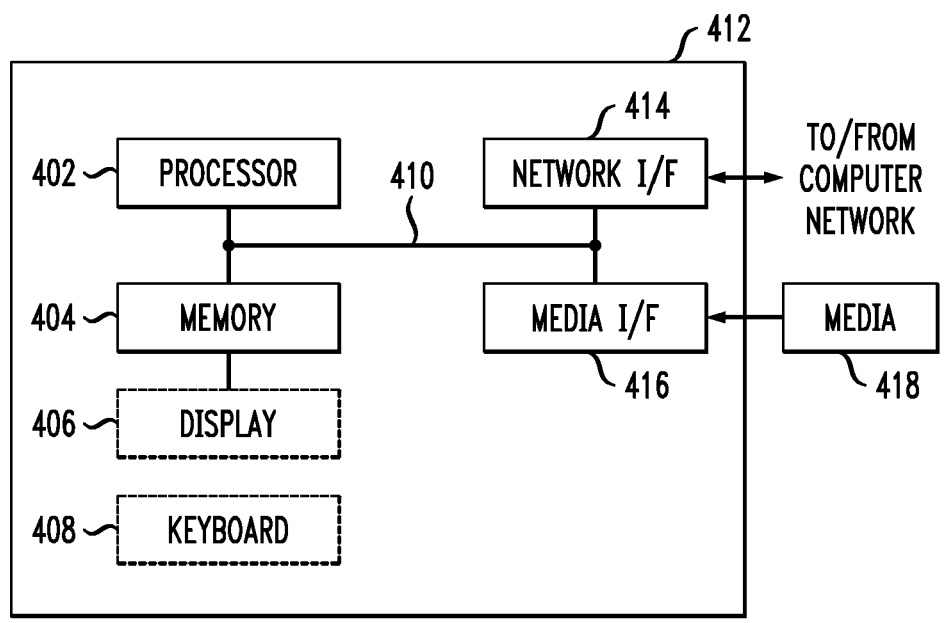
FIG. 4 depicts a computer system that may be useful in implementing one or more aspects and/or elements of the present invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 404), magnetic tape, a removable computer diskette (for example media 418), a random access memory (RAM), a read-only memory (ROM), a rigid magnetic disk and an optical disk. Current examples of optical disks include compact disk-read only memory (CD-ROM), compact disk-read/write (CD-R/W) and DVD.

A system, preferably a data processing system, suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for recommending range-partitioned tables in a relational database, said method comprising the steps of:
   obtaining a workload specification for said database, said workload specification detailing specific queries and a frequency of execution of each of said queries;
   obtaining a catalog specification for said database, said catalog specification detailing a definition of tables and columns within said tables;
   obtaining a set of partitions for said database;
   identifying, based at least in part on said obtaining steps, a plurality of candidate ones of said tables for said database, said candidate ones of said tables having a plurality of candidate ones of said columns, wherein identifying a plurality of candidate tables for said database comprises:
      selecting a set of said columns on which said tables of said database are suitable to be partitioned, based on said catalog specification;
      based on said workload, selecting a most frequently occurring set of said columns;
      identifying an intersection of (i) said set of said columns on which said tables of said database are suitable to be partitioned and (ii) said most frequently occurring set of said columns; and
      identifying said candidate columns for each of said candidate tables, from said intersection;

allocating at least one chosen column for each of said candidate ones of said tables, to obtain a set of partitioned tables and a set of appropriate partitions for each of said partitioned tables, wherein said step of allocating at least one chosen column for each of said candidate tables is based at least on extracting natural ranges present in said workload, and wherein said step of allocating at least one chosen column for each of said tables comprises finding actual data to reside in each of said partitions, so that execution of said workload is enhanced, said finding of said actual data being based upon said candidate columns and said set of partitions;

estimating query workload execution costs, wherein said execution of said workload is optimized based on minimizing said query workload execution cost, wherein said step of estimating query workload execution costs comprises:

creating an upper triangular matrix A, said matrix A storing a number of rows in each of a plurality of different sub-sets of cells, an entry A[i,j] in said matrix A representing a number of rows present in a partition formed of cells i to j;

creating an upper triangular matrix B, said matrix B storing a number of queries in said workload that access a given one of said partitions; and computing a cost matrix wherein cost of a given partition is given by multiplying corresponding entries in said matrix A and said matrix B; and employing a recurrence relation to compute said appropriate partitions, based on said cost matrix.

2. The method of claim 1, wherein said finding of said actual data is carried out via dynamic programming techniques.

3. The method of claim 1, further comprising taking into account a maximum percentage of a corresponding column that a given one of said partitions should occupy.

4. The method of claim 1, further comprising obtaining human-provided hints to model future changes of said data.

5. The method of claim 1, further comprising:
computing a cost of using fixed size buckets; and
affording a database administrator an option to select repetitive buckets;
wherein said buckets comprise groups of at least one of said cells, said cells being contiguous.

6. The method of claim 1, wherein said step of obtaining said set of partitions for said database comprises obtaining a user specification of a number of partitions to be generated.

* * * * *